(12) United States Patent
Jang et al.

(10) Patent No.: US 7,092,366 B2
(45) Date of Patent: Aug. 15, 2006

(54) RADIO NETWORK CONTROLLER IN IMT-2000 ASYNCHRONOUS SYSTEM

(75) Inventors: Jae Deug Jang, Taejon (KR); Hyeong Jun Park, Taejon (KR); Moon Soo Jang, Taejon (KR); Jee Hwan Ahn, Taejon (KR)

(73) Assignees: Samsung Electronics Co., Ltd., Suwon-si (KR); Electronics and Telecommunications Research Institute, Taejon (KR)

( * ) Notice: Subject to any disclaimer, the term of this patent is extended or adjusted under 35 U.S.C. 154(b) by 1029 days.

(21) Appl. No.: 10/020,203

(22) Filed: Dec. 18, 2001

(65) Prior Publication Data

US 2002/0075828 A1   Jun. 20, 2002

(30) Foreign Application Priority Data

Dec. 18, 2000   (KR) ............................... 2000-77648

(51) Int. Cl.
*H04B 7/00*   (2006.01)
*H04B 7/216*   (2006.01)
*H04Q 7/00*   (2006.01)

(52) U.S. Cl. .................. 370/310.2; 370/328; 370/331; 370/335; 370/342

(58) Field of Classification Search ............. None
See application file for complete search history.

(56) References Cited

U.S. PATENT DOCUMENTS 5,623,495 A * 4/1997 Eng et al. ................... 370/397
6,144,645 A   11/2000 Struhsaker et al.
6,574,221 B1 * 6/2003 Petersen .................. 370/395.1
6,876,634 B1 * 4/2005 Lim ........................ 370/310.1
6,879,569 B1 * 4/2005 Jeong et al. ................. 370/328
6,944,462 B1 * 9/2005 Riihinen et al. ............. 455/453
6,950,412 B1 * 9/2005 Lee et al. ................. 370/310.2

FOREIGN PATENT DOCUMENTS

KR   10-0248074   12/1999

* cited by examiner

*Primary Examiner*—Chi Pham
*Assistant Examiner*—Melanie Jagannathan
(74) *Attorney, Agent, or Firm*—Mayer, Brown, Rowe and Maw LLP

(57) ABSTRACT

A radio network controller of an IMT-2000 asynchronous system that includes a Node-B matching radio access system for accessing to a Node-B; a traffic processing radio access system for performing a soft handover of radio traffic channels of the base transceiver stations; and an ATM switch accessible to the traffic processing radio access system, for providing a path for communicating traffic and control data in the radio network controller, switching ATM cells, providing a path for transmitting various traffic between radio network controllers and soft handover between the radio network controllers. The radio network controller further includes a network matching radio access system for accessing to the ATM switch and a core network; a network synchronization system for generating and providing clocks needed for the radio network controller; a radio network controller controlling system for performing a call processing and a radio signal accessing by controlling the ATM switch; and a radio access network operation & maintenance system for managing and maintaining the base transceiver station and the radio network controller through an 100Base-T Ethernet path and the ATM switch path.

9 Claims, 2 Drawing Sheets

RADIO NETWORK CONTROLLER IN IMT-2000 ASYNCHRONOUS SYSTEM

FIELD OF THE INVENTION

The present invention relates to a radio network controller of an IMT-2000 asynchronous system; and, more particularly, to a radio network controller in an IMT-2000 asynchronous system for providing multimedia communication service as well as voice services.

DESCRIPTION OF RELATED ART

Current mobile communication system provides voice-based services, however, an IMT-2000 asynchronous system supports subscribers to correspond any types of information, such as voice services, packet communication, data and images, with anyone, at any place, at any time. With a radio access improved to provide the various forms of services, it offers diverse services to users in varying mobile communication environment.

FIG. 1 is a block diagram illustrating a universal mobile communication system. The system includes a mobile user equipment (UE) 11, Node-Bs (which is also referred to as base stations) 12 and 16, radio network controllers 13 and 17, a circuit switching network 14, packet switching network 18, a public switched telephone network (PSTN) 15 and an Internet network 19.

The network elements for controlling radio resources in a radio access network include: a radio network 1 having the Node-Bs 12 and 16, and the radio network controllers 13 and 17 accessing to the Node-Bs 12 and 16 and a core network 2; a core network 2 having a circuit switching network 14 for a voice-based bearer access and call process and a packet switching network 18 for a packet-based bearer access and call process; and an external network 3 having a public switched telephone network 15 and an Internet network 19.

The mobile user equipment 11 of the radio network 1 stores subscriber information needed for subscriber identification, authentication algorithm performance, certification, password memorization and the user equipment. The Node-Bs 12 and 16 carry out the function of L1 process of air interfaces such as a channel coding, an interleaving, a speed adaptation and a spreading, and the function of operating and managing the radio resources. Connected to the external circuit switching network, the circuit switching network 14 serves the role of a gateway and the function of circuit switching and, while the packet switching network 18 performs the function of storing subscriber information and location information for the packet switching service of the subscribers registered on the packet switching network and storing packet data traffic subscriber information and routing information. The public switched telephone network 15 includes the conventional public land mobile network, the public switched telephone network and the Integrated Services Digital Network (ISDN), and the Internet network 19 provides multimedia services such as a packet communication images, and data.

The mobile user equipment 11 stores subscriber information needed for subscriber identification, certification algorithm performance, certification, password memorization and the user equipment accesses to the base transceiver stations 12 and 16 through the Uu interface. The Node-Bs 12 and 16 perform the function of L1 process of air interfaces such as the channel coding, the interleaving, the speed matching and the spreading, and it is connected to the radio network controllers 13 and 17 through the Iub interface. The radio network controllers 13 and 17 support the soft handover and the radio resource management algorithm and carries out the function of using the same interface for connecting the circuit switching and packet switching domains in the core network 2, the function of switching the circuit into the air interface protocol stack and the function of processing the packet switching data.

Accordingly, the radio network controller 13 for the circuit switching service is connected to the circuit switching network 14 through an Iu-CS (Circuit Switching) interface and takes charge of relaying all the inputs and outputs of the circuit switching, and provides a circuit switching connection just like the conventional telephone service by serving as a gateway to the external public switching telephone network 15 through the circuit switching network 14. For packet switching service, the radio network controller 17 is connected to the packet switching network 18 through an Iu-PS (Packet Switching) interface and provides packet data service connection by serving as a gateway to the external Internet network 19 therethrough. The radio network controller 13 includes a part of the packet switching network connected through the radio network controller 13 like the packet domain; and a part of the circuit switching network connected through the radio network controller 17 like the circuit domain.

The radio network controllers 13 and 17 are connected to each other through an Iur interface. The Iur interface performs the function of soft handover, which switches the traffic channel with a new frequency automatically in order to keep the user equipment to communicate continuously and thus solve the problem of disconnection that occurs when the frequency of the user equipment moves into another base transceiver station, or comes back to its own zone from that of another base transceiver station, or the user equipment is in use, as it continues to operate.

Therefore, a radio network controller that is installed between the Node-B and the core network and processes the above-mentioned functions needs to be embodied.

SUMMARY OF THE INVENTION

It is, therefore, an object of the present invention to provide a radio network controller that can provide subscribers with high-speed multimedia services of data and images as well as a low-speed voice service in an IMT-2000 asynchronous system.

In accordance with an embodiment of the present invention, there is provided a radio network controller in an IMT-2000 asynchronous system, comprising: a Node-B matching radio access system for accessing to a Node-B; a radio access system for traffic process, which carries out the function of soft handover of a radio traffic channel between the Node-Bs; an ATM switch accessed to the Node-B matching radio access system and the radio access system for traffic process, for providing a path for communicating traffics and control data in the radio network controller, switching ATM cells, providing a path for transmitting various traffics between the radio network controllers and soft handover between the radio network controllers; a network matching radio access system for accessing to the ATM switch and the core network; a network synchronization system for generating and providing the clocks needed for the respective systems in the radio network controller; a radio network controller control system for call processing, network signal accessing and communication with the processor of each system by controlling the ATM switch; and a radio access network operation & maintenance system for operating and maintaining the Node-B and the radio network controller through the 100Base-T Ethernet path and the ATM switch path.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
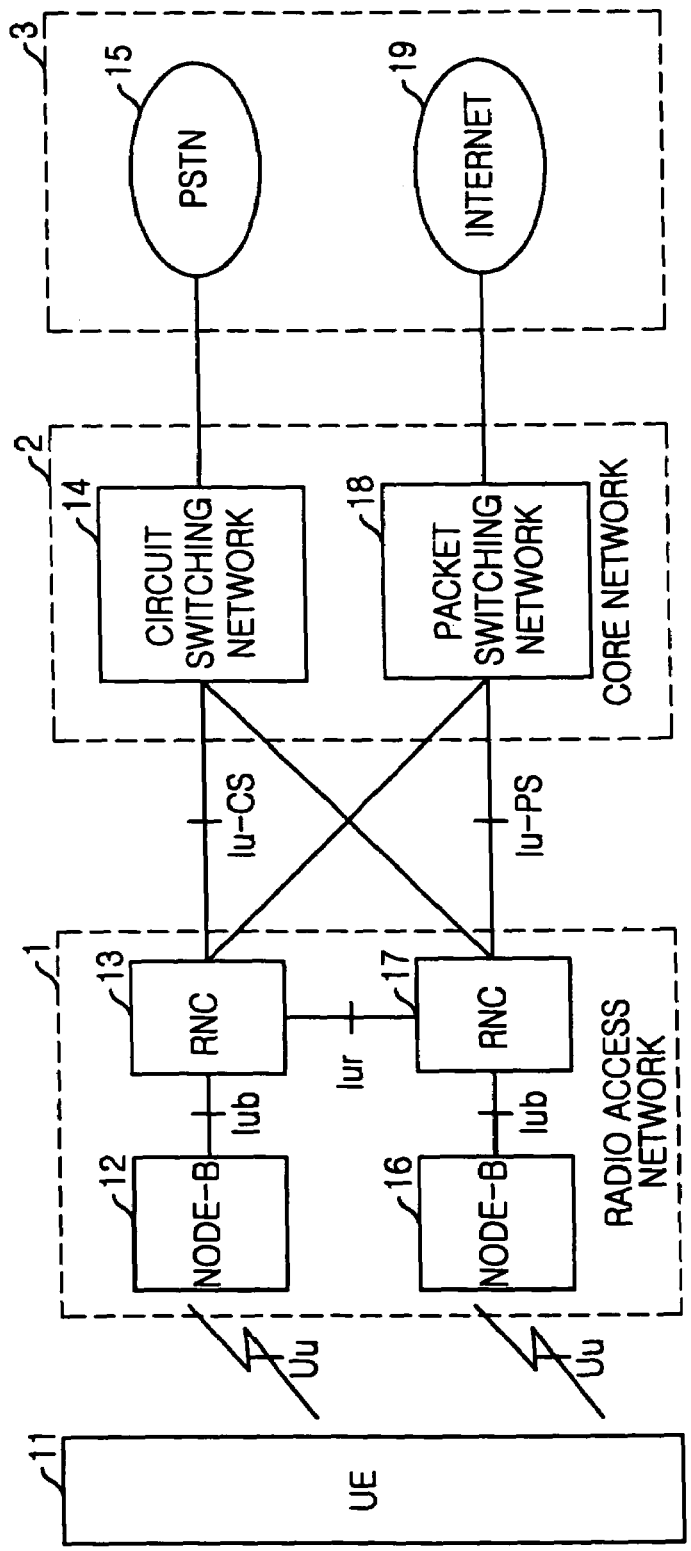
FIG. 1 is a block diagram illustrating a universal mobile telecommunication system.
Figure 2:
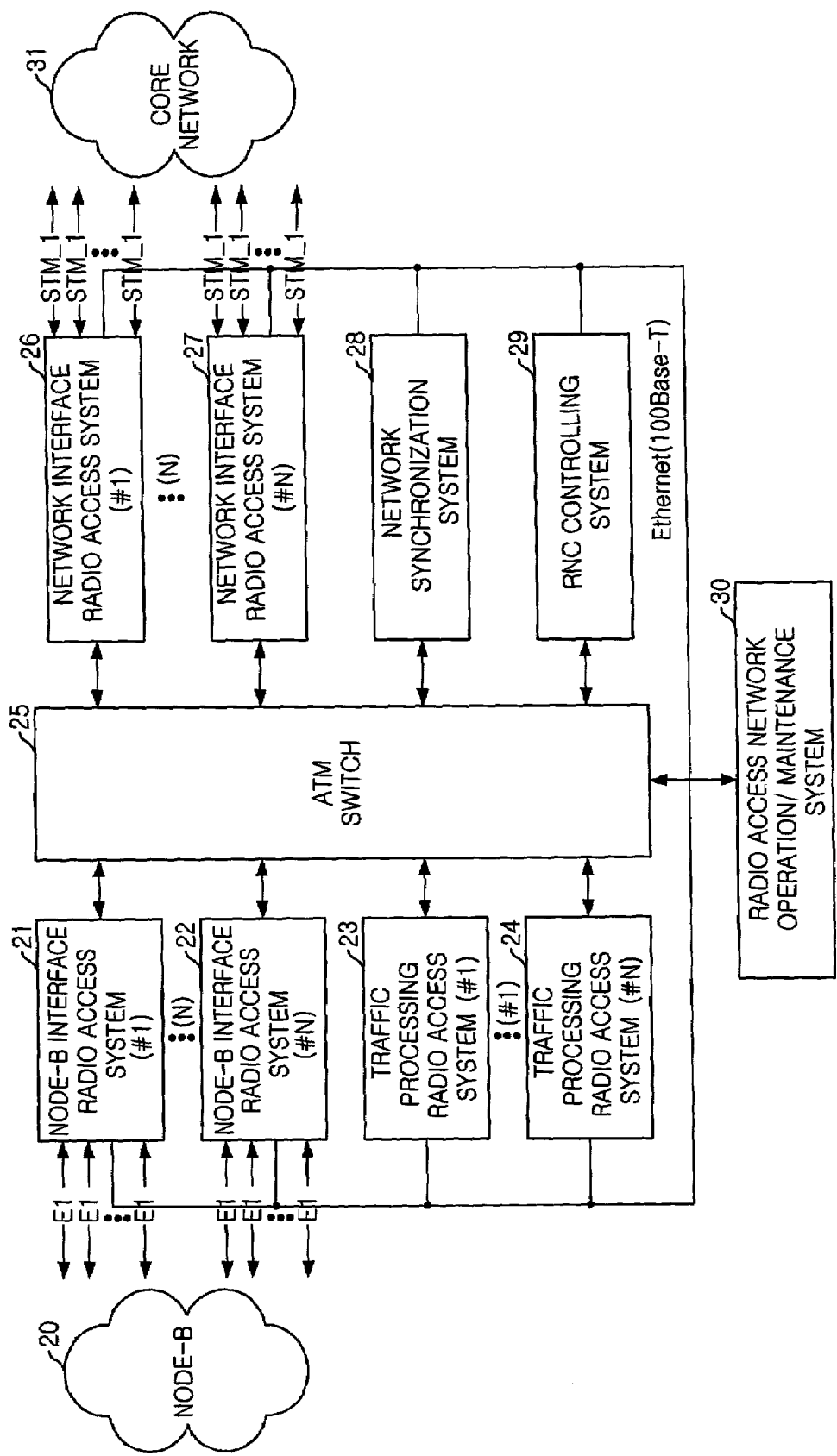
FIG. 2 is a block diagram showing a radio network controller in accordance with an embodiment of the present invention.

FIG. 2 is a block diagram showing a radio network controller in accordance with an embodiment of the present invention.

The radio network controller includes Node-B (which is also referred to as a base station) matching radio access systems 21 and 22, traffic processing radio access systems 23 and 24, an ATM switch 25, network matching radio access systems 26 and 27, a network synchronization system 28, a radio network controller (RNC) controlling system 29 and a radio access network operation & maintenance system 30.

The Node-B matching radio access systems 21 and 22 perform the function of accessing to the Node-B 20 that carries out the L1 process of air interfaces such as a channel coding, an interleaving, a speed adaptation and a spreading.

The traffic processing radio access systems 23 and 24 process soft handover of a radio traffic channel between the Node-B.

The ATM switch 25 of 16×16 155 Mbps provides paths through which traffics and control signals between the systems inside the radio network controller or between the radio network controllers are transmitted, and performs a switching of ATM cells and the soft handover between the radio network controllers.

The network matching radio access systems 26 and 27 performs the function of accessing to a core network or other radio network controllers.

The network synchronization system 28 for performs the function of generating and supplying clocks needed for the systems in the radio network controller.

The RNC controlling system 29 performs the functions of processing calls, accessing of a network signal and communicating with the processor of each system.

The radio access network operation & maintenance system 30 performs the functions of operating and maintaining the radio access network, i.e., the Node-B and the radio network controller.

In the IMT-2000 asynchronous system, the Node-B 20 is connected to the Node-B matching radio access systems 21 and 22 and the ATM E1 interface in the form of an inverse multiplexer for ATM (IMA) and carries out the function of the radio traffic access and accommodates 7,680 channels per a radio network controller including four systems therein each of which can contain up to 1,920 channels according to the configuration. The Node-B matching radio access systems 21 and 22 perform the function of converting/inverse-converting ATM adaptation layer (AAL2/AAL5) type, the function of matching E1 trunk line, the function of converting virtual path/virtual channel, the function of detecting abnormality of a physical link layer and the function of inverse-multiplexing. It is connected to the STM-1 interface through the network matching radio access systems 26 and 27 so as to access to the ATM switch 25 and to the core network 31 having the circuit switching network and the packet switching network.

The network matching radio access systems 26 and 27 carry out the function of converting/inverse-converting ATM adaptation layer (AAL2/AAL5) type, the function of matching 155 Mbps STM-1, the function of converting virtual path/virtual channel, the function of detecting abnormality of a physical link layer and the function of multiplexing/inverse-multiplexing.

The traffic processing radio access systems 23 and 24 perform the function of managing the radio channel resources between the Node-B and they accommodate a total of 7,680 channels per one radio network controller in four systems therein each of which can contain up to 1,920 channels according to the configuration, just as the Node-B matching radio access systems 21 and 22. The traffic processing radio access systems 23 and 24 perform the function of traffic and call data selection and distribution, the function of power control, handover, 155 Mbps LVDS (Low Voltage Differential Signaling) interface, the function of processing the voice and the image data traffics received and transmitted between the user equipment and the core network, the function of processing the data packet traffics received and transmitted between the radio network controllers. In case the Node-B 20 accesses to another radio network controller, the traffic processing radio access systems 23 and 24 perform the soft handover of the radio traffic channels, and they are connected to the core network through the ATM switch 25 and the network matching radio access system 26.

The network synchronization system 28 generates and distributes system reference clocks using a reference clock, receives and distributes a Time of Date (TOD) signal, and synchronizes a 155 Mbps STM-1 extraction clock from the core network into the reference clock. The network synchronization system 28, which is a system providing a network synchronization of the IMT-2000 radio network controller system, generates and provides the clocks needed for each system to make each system in the radio network controller operate in a synchronous system by receiving a Global Position system (GPS) clock optionally.

The RNC controlling system 29 includes a call control processor, a signaling processor, a maintenance processor and a radio network controller hardware alarm collection unit (not shown). The RNC controlling system 29 performs the function of a call processing; the function of accessing/maintaining/releasing of a network signal between the radio network controller and the core network; the function of collecting system failure information of the systems in the radio network controller and collecting hardware alarm information; the function of receiving a message from the radio access network operation & maintenance system 30 and conducting communication between the processors of each system through the 100Base-T Ethernet path and the ATM switch 25 path. The ATM switch 25 carries out the functions of providing a communication path for traffics and control data between the systems in the radio network controller, switching the ATM cells, transmitting the voice and the data traffic information and control information between the Node-B and the radio network controller, providing a path for transmitting traffics and the soft handover between the radio network controllers.

The radio network operation & maintenance system 30 is connected to the respective systems in the radio network controller through the 100Base-T Ethernet and performs the function of managing the operation and maintenance of the Node-B and the radio network controller; the function of maintaining normal operation such as system loading, configuration, statistics, state and system error; and the function of operator matching.

The present invention described above provides multimedia services such as data and images with 2 Mbps transmission speed as well as a low-speed voice service in the IMT-2000 asynchronous system, thus making it possible to offer services such as multimedia service, video conference and Internet access by using personal communication service (PCS).

While the present invention has been described with respect to certain preferred embodiments, it will be apparent to those skilled in the art that various changes and modifications may be made without departing from the scope of the invention as defined in the following claims.

What is claimed is:

1. A radio network controller in an IMT-2000 asynchronous system, comprising:
    a Node-B matching radio access system for accessing to a Node-B;
    a traffic processing radio access system for performing a soft handover of radio traffic channels of the Node-B;
    an ATM switch accessible to the traffic processing radio access system, for providing a path for communicating traffics and control data in the radio network controller, switching ATM cells, providing a path for transmitting various traffic between radio network controllers and soft handover between the radio network controllers;
    a network matching radio access system for accessing to the ATM switch and a core network;
    a network synchronization system for generating and providing clocks needed for the radio network controller;
    a radio network controller controlling system for performing a call processing and a network signal accessing by controlling the ATM switch; and
    a radio access network operation & maintenance system for operating and maintaining the Node-B and the radio network controller through an 100Base-T Ethernet path and the ATM switch path.

2. The radio network controller as recited in claim 1, wherein the Node-B and the Node-B matching radio access system are connected to each other through an E1 interface which performs a radio traffic access function.

3. The radio network controller as recited in claim 1, wherein the Node-B matching radio access system performs functions of converting/inverse-converting the ATM adaptation layer type, matching an E3 trunk line, converting virtual path/virtual channel and detecting abnormality in a physical link layer and an inverse-multiplexing.

4. The radio network controller as recited in claim 1, wherein the network matching radio access system is connected to the core network with an STM-1 interface and performs the functions of converting/inverse-converting the ATM adaptation layer type, matching an STM-1, converting virtual path/virtual channel, detecting abnormality of a physical link layer and multiplexing/inverse-multiplexing.

5. The radio network controller as recited in claim 1, wherein the traffic processing radio access system performs a function of radio channel resources management between the Node-B; a function of selecting and distributing traffics and signal data; a function of power control, handover and a LVDS interface; a function of processing voice and image traffic received and transmitted between a user equipment and the core network; and a function of processing data packet traffic received and transmitted between radio network controllers.

6. The radio network controller as recited in claim 1, wherein the network synchronization system performs a function of generating and distributing system reference clocks, receiving and distributing a Time of Date signal, synchronizing an STM-1 extraction clock received from the core network into a reference clock and receiving a GPS (Global Position System) clock.

7. The radio network controller as recited in claim 1, wherein the radio network controller controlling system includes a call control processor, a signaling processor, a maintenance processor and a radio network controller hardware alarm collection device, and it performs the function of generally controlling functions related to call process; a function of accessing/maintaining/canceling a network signal between the radio network controller and the core network; a function of collecting system failure information of the systems in the radio network controller and collecting hardware alarm information; the function of receiving a message from the radio access network operation & maintenance system; and a function of conducting communication between the processors of the systems through the Ethernet path and the ATM switch path.

8. The radio network controller as recited in claim 1, wherein the ATM switch performs a function of providing a path for traffic and control data between the systems of the radio network controller; a function of switching ATM cells, transmitting voice and data traffic information and control information between the Node-B and the radio network controller; the function of providing a path for transmitting traffics; and the function of soft handover between the radio network controllers.

9. The radio network controller as recited in claim 1, wherein the radio access network operation & maintenance system is connected to the systems in the radio network controller through the Ethernet and performs the function of managing the general management and maintenance of the Node-B and the radio network controller; the function of maintaining normal operation such as system loading, configuration, statistics, state and system error; and the function of operator matching.

* * * * *